United States Patent [19]
Vickland

[11] 4,090,413
[45] May 23, 1978

[54] CYCLIC MOTION GENERATOR
[75] Inventor: Jack M. Vickland, Palo Alto, Calif.
[73] Assignee: Ford Aerospace & Communications Corp., Dearborn, Mich.
[21] Appl. No.: 736,925
[22] Filed: Oct. 29, 1976
[51] Int. Cl.² .............................................. F16H 37/06
[52] U.S. Cl. ................................ 74/665 GB; 74/713; 74/29; 74/50
[58] Field of Search ........................... 74/410, 665 GB

[56] References Cited
U.S. PATENT DOCUMENTS

| 2,470,985 | 5/1949 | Illsche | 74/665 GB |
| 3,779,102 | 12/1973 | Pfarrwaller | 74/410 |

Primary Examiner—Benjamin W. Wyche
Assistant Examiner—Wesley S. Ratliff, Jr.
Attorney, Agent, or Firm—John J. Roethel; Keith L. Zerschling

[57] ABSTRACT

A cyclic motion generator comprising a mechanism capable of providing from a constant speed input a cyclic motion output, either linear or rotary depending on the application, which can be sinusoidal. The new mechanism has the further capability of being conveniently manually infinitely adjustable in amplitude from zero to maximum without requiring stoppage or disconnection of the input or the output.

5 Claims, 4 Drawing Figures

CYCLIC MOTION GENERATOR

BACKGROUND OF THE INVENTION

Reciprocating motion in machinery is usually generated by means of a simple crank mechanism where pure sinusoidal motion is not required; or by means of a scotch yoke mechanism (crank and slide) where pure sinusoidal motion is required. In either case adjustment of the output motion amplitude requires stopping the machine to change the crank arm length.

In many machine applications it would be desirable to have a cyclic reciprocating motion which is infinitely adjustable in amplitude from zero to maximum without stopping or disconnecting the input or output.

SUMMARY OF THE INVENTION

The present invention relates to a cyclic motion generator comprising a motor means having an output shaft. Coupled to the motor means output shaft are a first and a second differential means each having rotatable input and output members, the rotary movement of each output member having the same amplitude and period. Parallel scotch yoke mechanisms are respectively coupled to each differential means output member for converting rotary motion of the latter into linear motion of an output member of each scotch yoke mechanism, the linear motion of the output member of each scotch yoke mechanism also having the same amplitude and period.

The cyclic motion generator also includes a third differential means having a pair of input members each one of which is coupled to one of the scotch yoke mechanism output members. The third differential means has an output member whose motion is the resultant of the movements of its two input members. A phase adjustment means is provided for varying the movement phase of the output member of the first and second differential means relative to one another and thereby of the scotch yoke mechanism output members relative to one another. The combined peak amplitude of the third differential means output member may be varied through the phase adjustment means between zero and peak, zero being obtained when the first and second differentials are 180° out of phase, and peak being obtained when the first and second differentials are in phase with each other.

DESCRIPTION OF THE DRAWINGS

Further features and advantages of the present invention may be more apparent as this description proceeds, reference being had to the accompanying drawings wherein.

DETAILED DESCRIPTION OF THE INVENTION

Figure 1:
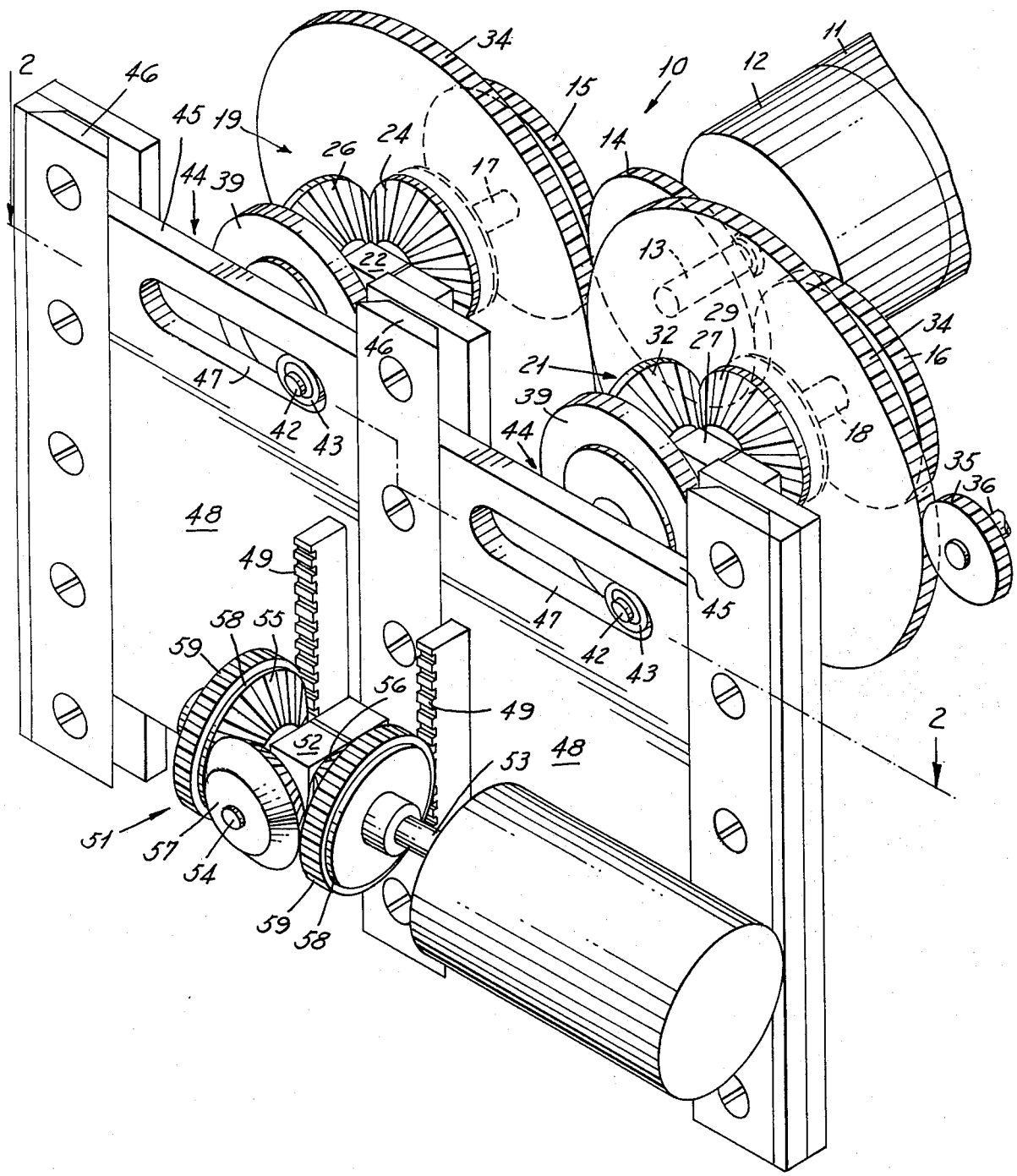
FIG. 1 is a perspective view of a cyclic motion generator embodying the present invention.

The basic principle on which the cyclic motion generator embodying the present invention is based is: If two sinusoidal functions having the same period are added together algebraically, they will generate another sinusoidal function having the same period. Thus, if two sinusoidal functions are generated having the same period and amplitude (A), their phase relationship can be adjusted so that their combined peak amplitude is variable between 0 and 2A. If the phase adjustment is made to both functions in equal and opposite directions, the time phase relationship of the combined output will not be changed.

Referring now to the drawings, the basic principle is implemented in the present invention as follows:

The cyclic motion generator, generally designated 10 in FIG. 1, comprises a motor 11 having a reduction gear unit 12 driving an output shaft 13. The output shaft 13 has coupled to it a spur gear 14 which is in mesh with a pair of spur gears 15 and 16 that are keyed to parallel shafts 17 and 18. The shafts 17 and 18 are the input members to a pair of operatively parallel differential means represented by the differential gear sets generally designated 19 and 21.

Referring now to the differential gear set 19, it has a spider 22 that consists of the shaft 17 and a second shaft 23. The shaft 23 is fixed or rigidly coupled at right angles to the shaft 17 intermediate the ends of the latter. A pair of spaced, axially aligned, freely rotatable bevel gears 24 and 25 are journaled on opposite ends of the spider shaft 17. Each of the gears 24–25 are in mesh with an intermediate bevel gear 26 which is freely rotatable on the shaft 23. The gear set 21 correspondingly comprises a spider 27 that consists of the shaft 18 and a shaft 28 at right angles to the latter. The shaft 18 carries two bevel gears 29 and 31 in mesh with an intermediate bevel gear 32.

Figure 2:
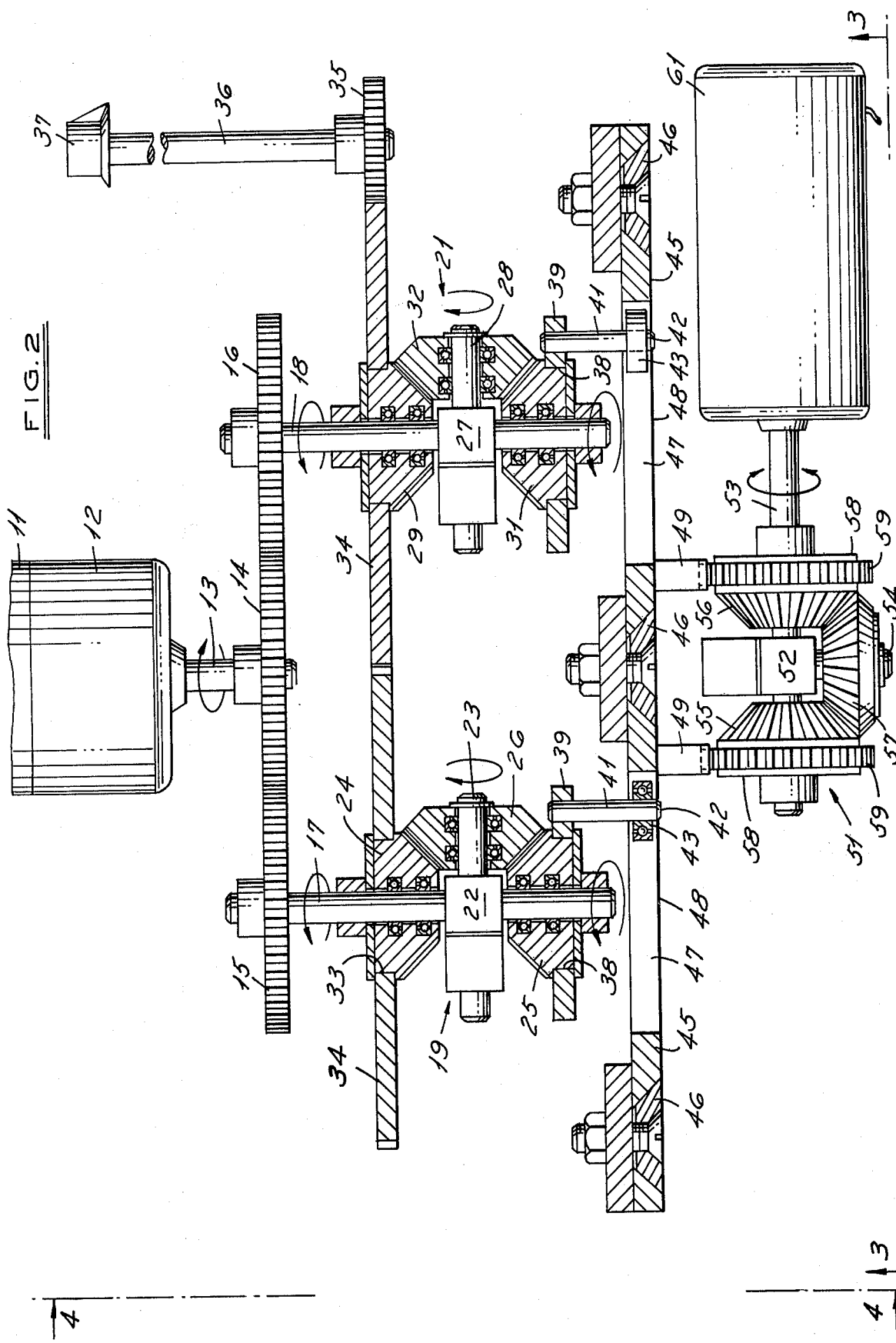
FIG. 2 is a sectional view taken substantially on the line 2—2 of FIG. 1.

Rigidly mounted on the cylindrical perimeter 33 of each gear set bevel gear 24 and 29, respectively, is a large diameter spur gear 34, the two spur gears being in mesh with each other as seen in FIG. 2. One of the spur gears 34 also is in mesh with a much smaller spur gear 35 which is carried on one end of the shaft 36. The other end of the shaft 36 carries a control knob 37. The gear 34 and 35, the shaft 36 and the control knob 37 comprise the elements of an amplitude adjustment means, the function of which will become apparent.

Figure 3:
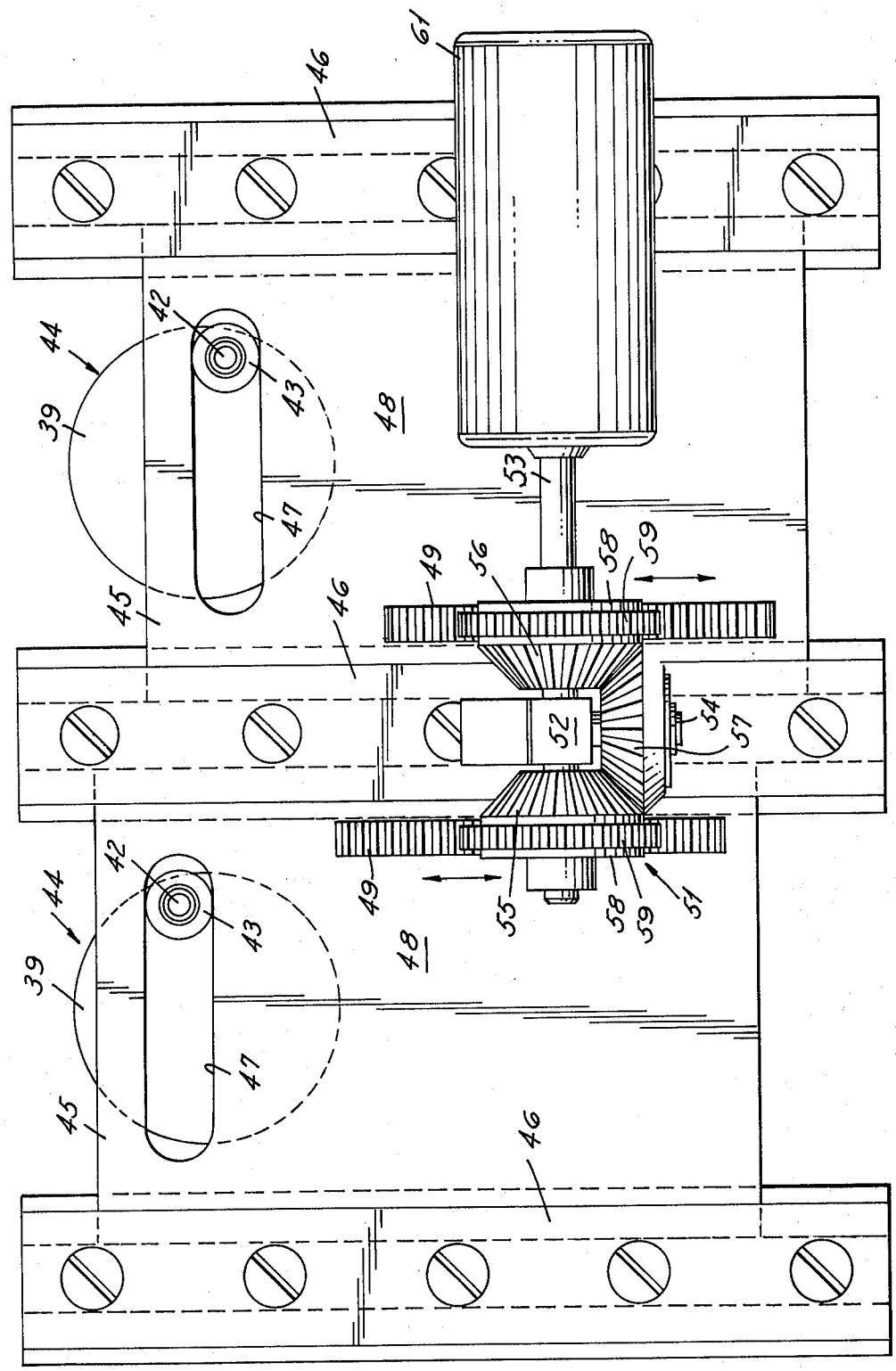
FIG. 3 is a sectional view taken substantially on the line 3—3 of FIG. 2.
Figure 4:
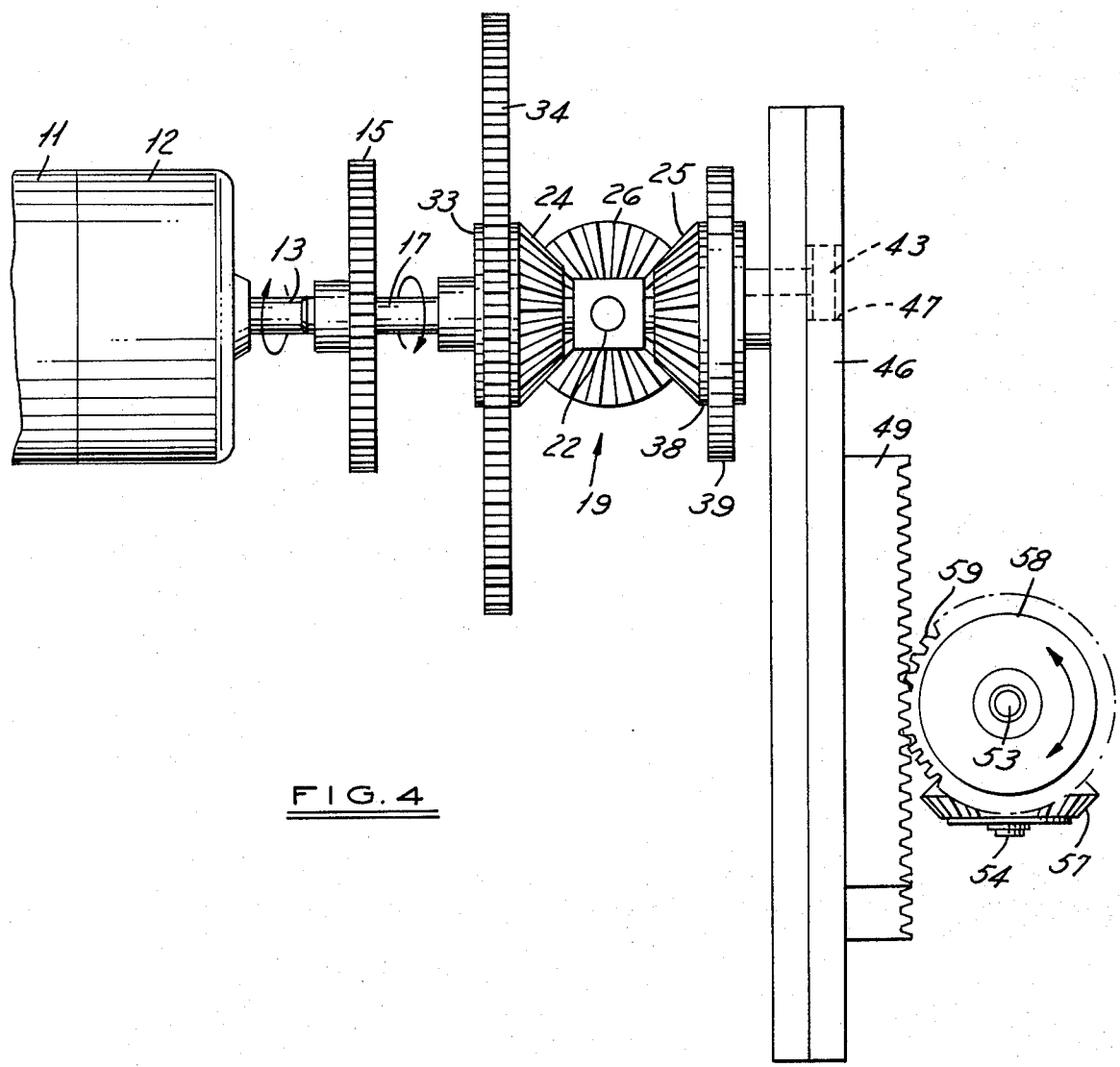
FIG. 4 is a side view taken in the direction of the arrows 4—4 of FIG. 2.

Rigidly mounted on the cylindrical perimeter 38 of each gear set bevel gear 25 and 31, respectively, is a disc 39 carrying a pin or small shaft 41. The axis of each shaft 41 is radially offset from and parallels the axis of rotation of the related spider shaft 17 or 18. Each shaft 41 carries at its free end 42 a roller 43. Each disc 39, shaft 41 and roller 43 comprises the crank arm of a scotch yoke mechanism, generally designated 44, as best seen in FIGS. 1 and 3. The present invention utilizes two of the scotch yoke mechanisms.

In addition to the elements comprising the crank arm, each scotch yoke mechanism 44 comprises a slide member 45 guided for linear movement in spaced parallel guideways 46. Three guideways 46 are utilized with the center one being in common to both scotch yoke mechanisms so that both slide members 45 are guided for parallel reciprocal movement relative to each other. Mounted on the face 48 of each slide member 45 is a rack 49 extending longitudinally in the direction of reciprocation of the slide members 45. Through the scotch yoke mechanism 44, rotation of the bevel gears 25 and 31 of each gear set 19 and 21, respectively, is thus converted into linear reciprocal movement of each slide member 45 mounted rack 49.

The cyclic motion generator 10 includes a third differential means in the form of a differential gear set generally designated 51. The differential gear set 51 comprises a spider 52 which consists of a main shaft 53 and a stub shaft 54 at right angles to the main shaft. The main shaft 53 carries two freely rotatable bevel gears 55 and 56 which are in mesh with an intermediate gear 57 freely rotatable on the stub shaft 54. The bevel gears 55-56 of the third differential gear set 51 are the input means for this third differential means. The perimeter 58 of each bevel gear 55-56 has mounted thereon or is provided with a spur gear 59. Each spur gear 59 is in mesh with a rack 49 whereby reciprocatory motion of the racks is converted into rotary motion of the bevel gears 55-56, respectively. Rotation of these gears causes the intermediate gear 57 to walk around the axis of rotation of the gears 55-56 thereby causing the spider 52 to rotate its main shaft 53 about the same axis. The shaft 53 may be directly coupled to a rotatable machine tool element or to a synchro device 61 providing a motivating signal to a servo system.

OPERATION

The operation of the cyclic motion generator 10 may be summarized as follows:

A motor 11 is operated to drive its output shaft 13 and its gear 14 at a constant speed. The gear 14 drives gears 15 and 16 and the main shafts 17 and 18 of the gear sets 19 and 21. Rotation of the main shafts 17 and 18 results in rotation of the spiders 22 and 27 about the axis of each main shaft 17 and 18, respectively. Gears 34 coupled to the bevel gears 24 and 29, respectively, are held stationary by the gear 35 mounted on the end of the amplitude adjusting shaft 36, thus holding the gears 24 and 29 stationary. Because the spiders 22 and 27 are being rotated about the axis of their respective main shafts 17 and 18, the intermediate gears 26 and 32 are caused to rotate. This rotation is transmitted to the end gears or bevel gears 25 and 31. The bevel gears 25 and 31 rotate at a rate proportional to the speed of the motor 11.

Rotation of each end gear 25 and 31 results in the pins or shafts 41 being rotated about the axis of the respective shafts 17 and 18 of the gear sets. Since the pins or shafts 41 are rotated at the same speed, since they are the driving members or crank arms of the scotch yoke mechanisms 44, the scotch yoke linear elements, the slide members 45, reciprocate or translate at a speed which is a function of the rotation of the motor 11 or the bevel gears 25 and 31.

If the amplitude adjustment knob 37 is rotated, the gears 34 and thereby the respective gears 24 and 29 of the differential gear sets will be rotated in counter directions. This, in turn, causes the intermediate gears 26 and 32 to likewise be rotated in counter or opposite directions. This results in one spider being advanced while the opposite spider retreats an equal amount of rotation. This then results in the slide members 45 of the scotch yoke mechanisms 44 being moved out of phase with respect to each other. This further results in the racks 49 rotating gears 55 and 56 of the third differential gear set 51 out of phase with respect to each other. The out of phase rotations of gears 55 and 56 are algebraically added by intermediate gear 57 and spider 52 and transmitted by the shaft 53 to a synchro unit 61.

Thus, the amplitude of the sinusoidally varying synchro 61 or output shaft 53 rotation can be manually adjusted from 0 to a maximum without changing its time phase relationship and this may be done without stopping the motor 11. The amplitude control knob may be calibrated in "degrees of Peak Amplitude."

It will be understood that the various gear sets and scotch yoke mechanisms will be supported on suitable structural members.

It is further to be understood this invention is not limited to the exact construction illustrated and described above, but that various changes and modifications may be made without departing from the spirit and scope of the invention as defined by the following claims.

I claim:

1. A cyclic motion generator comprising:
   a motor means having an output shaft and a driving member coupled to the output shaft,
   a plurality of differential means comprising a first, second and third differential gear set each having a plurality of gears journalled on a rotatable spider,
   the gears of each of the gear sets including a pair of spaced bevel gears axially aligned on the spider for rotation about an axis about which the latter is rotatable,
   the axially aligned bevel gears being coupled by an intermediate bevel gear mounted on the spider for rotation about an axis at right angles to the axis of rotation of the spider,
   the first and second gear sets being operatively in parallel with each other,
   each first and second gear set being coupled through its spider to the driving member coupled to the motor output shaft whereby the input members of the first and second gear sets are the spiders of the latter,
   a pair of slide means,
   crank means connecting respective ones of the first and second gear sets and the pair of slide means to each other,
   the crank means being operative to translate rotary motion of a rotary member of each of the first and second gear sets into reciprocable slidable motion of the slidable means to which it is connected,
   each of the slidable means having driving engagement with a separate driven member of the third gear set,
   each of the driven members being coupled to a common output member of the third gear set,
   and an adjustment means coupled to the operatively parallel gear sets for shifting the output phase relationship of one relative to the other to cause the pair of reciprocable slide means and thereby the two driven members of the third gear set to move in predetermined phased relationship relative to one another during each movement cycle of the cyclic generator,
   the motion of the output member of the third gear set being a resultant of the movements of the two driven members of the latter.

2. A cyclic motion generator according to claim 1, in which:
   one of the pair of axially aligned bevel gears of each operatively parallel gear set is normally held stationary by the adjustment means so that rotation of each spider is transmitted through the intermediate bevel gear to the other axially aligned bevel gear causing the latter to rotate,
   each crank means includes a crank arm carried by the other of the axially aligned bevel gears,
   and each slide means includes a slide member coupled to the crank arm and reciprocable by the latter.

3. A cyclic motion generator according to claim 2, in which:
  each slide member carries a rack,
  and the driven members of the third gear set comprises a pair of axially aligned bevel gears freely rotatably journalled on a shaft of the spider of the third gear set,
  a rack on one slide member being in mesh with one of the last mentioned bevel gears and a rack on the other slide member being in mesh with the other one of the last mentioned bevel gears,
  the last mentioned bevel gears being operatively coupled to each other through an intermediate bevel gear freely rotatable on a second shaft of the third gear set spider.

4. A cyclic motion generator comprising:
  a motor means having an output shaft,
  a first, a second and a third differential gear set means,
  each of the differential gear set means having a plurality of gears journalled on a rotatable spider,
  each of the differential gear set means having rotatable input and output members,
  the spider being the input member of each of the first and second differential gear set means and the output member of the third differential gear set means,
  the rotary movement of each output member having the same amplitude and period,
  the gears of each of the gear sets including a pair of spaced bevel gears axially aligned on the spider for rotation about an axis about which the latter is rotatable,
  the axially aligned bevel gears being coupled by an intermediate bevel gear mounted on the spider for rotation about an axis at right angles to the axis of rotation of the spider,
  a first coupling means coupling each differential gear set means input member to the motor means output shaft,
  parallel scotch yoke mechanisms respectively coupled to each differential gear set means output member for converting rotary motion of the latter into linear motion of an output member of each scotch yoke mechanism,
  the linear motion of the output member of each scotch yoke mechanism having the same amplitude and period,
  a third differential gear set means having a pair of input members each coupled to one of the scotch yoke mechanism output members and an output member whose motion is the resultant of the movements of the two input members,
  and a phase adjustment means for varying the movement phase of the output member of the first and second differential gear set means relative to one another and thereby of the scotch yoke mechanism output members relative to one another,
  one of the pair of axially aligned bevel gears of each first and second differential gear set means normally being held stationary by the phase adjustment means so that rotation of each spider is transmitted through the intermediate bevel gear to the other axially aligned bevel gear causing the latter to rotate,
  the output member of each of the first and second differential gear set means comprising the other of the axially aligned bevel gears,
  and each scotch yoke mechanism including a crank arm carried by each of the other axially aligned bevel gears and a slide member coupled to the crank arm and reciprocable by the latter,
  the combined peak amplitude of the third differential gear set means output member being variable between zero and peak,
  the maximum amplitude being obtained when the first and second differentials are in phase and zero amplitude when they are 180° of of phase.

5. A cyclic motion generator according to claim 4, in which:
  each slide member carries a rack
  and the input members of the third differential gear set means comprises a pair of bevel gears axially aligned on a first shaft of the spider of the third differential gear set means for free rotation about an axis about which the spider is rotatable,
  a rack on one slide member being in mesh with one of the 1st mentioned bevel gears and a rack on the other slide member being in mesh with the other of the last mentioned bevel gears,
  the last mentioned bevel gears being operatively coupled to each other through an intermediate bevel gear freely rotatable on a second shaft of the third differential gear set means spider,
  the intermediate bevel gear moving relative to the last mentioned bevel gears to drive the spider about its axis of rotation.

* * * * *